United States Patent
Nagata et al.

(10) Patent No.: US 7,212,886 B2
(45) Date of Patent: May 1, 2007

(54) ROBOT CONTROL APPARATUS AND METHOD

(75) Inventors: Hideo Nagata, Fukuoka (JP); Kenichi Yasuda, Fukuoka (JP); Yasuyuki Inoue, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 578 days.

(21) Appl. No.: 10/735,241

(22) Filed: Dec. 12, 2003

(65) Prior Publication Data

US 2004/0128030 A1    Jul. 1, 2004

(30) Foreign Application Priority Data

Dec. 12, 2002 (JP) ............ P. 2002-360053

(51) Int. Cl.
*G06F 19/00* (2006.01)
(52) U.S. Cl. .......... 700/245; 700/246; 700/247; 700/249; 700/253; 700/260; 318/568.12; 318/568.18; 318/568.19; 901/1
(58) Field of Classification Search ........ 700/245; 318/568.18
See application file for complete search history.

(56) References Cited

U.S. PATENT DOCUMENTS 4,601,468 A * 7/1986 Bond et al. ............ 482/7
5,971,091 A * 10/1999 Kamen et al. .......... 180/218
6,519,860 B1 * 2/2003 Bieg et al. ............... 33/503
6,668,466 B1 * 12/2003 Bieg et al. ............... 33/503
6,919,701 B2 * 7/2005 Nagata et al. ........ 318/568.12

FOREIGN PATENT DOCUMENTS

| JP | 8-227320 A | 9/1996 |
| JP | 9-103945 A | 4/1997 |
| JP | 11-58285 A | 3/1999 |
| JP | 2000-5881 A | 1/2000 |

* cited by examiner

*Primary Examiner*—Thomas Black
*Assistant Examiner*—McDieunel Marc
(74) *Attorney, Agent, or Firm*—Sughrue Mion, PLLC

(57) ABSTRACT

A robot control apparatus including a motion torque calculating section for calculating a motion torque command which is required for a motion of a servo motor, a disturbance torque estimating section for calculating a disturbance torque, a minute displacement relationship calculating section for calculating a minute displacement relationship between a task coordinate system of a robot and a joint coordinate system of the servo motor, an external force calculating section for carrying out a conversion to an external force on the task coordinate system, a force control section for calculating a position correction amount on the task coordinate system of the robot, and a joint angle correction amount calculating section for carrying out a conversion to a joint angle correction amount on the joint coordinate system.

11 Claims, 10 Drawing Sheets

ROBOT CONTROL APPARATUS AND METHOD

BACKGROUND OF THE INVENTION

1. Field of the Invention

The present invention relates to a robot control apparatus and more particularly to a robot control apparatus and method of controlling the force of a robot on a task coordinate system and the generating force of a servo motor for driving a joint based on a torque set value.

2. Description of the Related Art

In a conventional robot, a control has been carried out by a position and speed control system for each joint axis of the robot. When carrying out playback reproduction for spot welding or seam welding having a contact with a work by means of such a control system, a great toque is generated by a gain set to be great in order to increase precision in positioning or the action of an integrator if there is the shift of the position of a work itself or the shift of a position in which the robot holds the work. When the great torque is generated, it is hard to carry out a work due to the deformation of the work, the generation of a welding defect or welding. In some cases, consequently, there is a danger that a tool or a robot might be broken. In a teaching work for an instructor to move the robot to a work position, moreover, it is necessary for the instructor to carefully move the control point of a spot gun to the hitting point of the work, thereby registering a position. Therefore, there is a danger that a gun electrode might be pushed against the work by mistake, resulting in deformation. For this reason, the degree of physical and mental fatigue is very high.

For such a problem, examples of a method of flexibly controlling a force by a task coordinate system without adding a special device to a robot include a method of setting a flexibility (spring constant) in an axial direction on each coordinate of the task coordinate system to specify an adapting property to an external force for individual axes in a space as shown in FIG. 10, or disclosure in JP Hei8-227320 or JP 2000-005881.

As a method of estimating an external force to carry out a force control, there is a method capable of estimating a random to the motor of each axis of a joint coordinate system by a random observer, thereby converting a random estimation value into the external force estimation value of a task coordinate system by a coordinate transformation using a Jacobian matrix such as shown in JP Hei11-58285 or JP Hei9-103945.

As described in JP Hei8-227320 or JP2000-005881, concerning the method of setting a flexibility (spring constant) by a task coordinate system to specify an adapting property to an external force in individual directions in a space, a torque generated by a servo motor is proportionally increased when a positional deviation is increased. Therefore, there is a problem in that a countermeasure cannot be taken when the positional deviation (moving distance) made by the external force is great. In the case in which a peripheral apparatus and a work are to be removed to release a contact state, moreover, a robot generates a force for returning to the original place of a position command. Consequently, there is a problem in that the robot impacts with the peripheral apparatus and the work again, resulting in the breakage of the peripheral apparatus and the work.

Moreover, Hei11-58285 and JP Hei9-103945 have disclosed a method of estimating the random of a joint coordinate system by a random observer, thereby converting a random estimation value into the external force estimation value of a task coordinate system by a coordinate transformation using the Jacobian matrix. In these conventional examples, there is a problem in that a lag is also generated on a detecting time by the use of a filter, and furthermore, the influence of a friction or a gravity is great so that an accurate external force estimation value cannot be obtained.

SUMMARY OF THE INVENTION it is an object of the invention to control a force on a task coordinate system which can correspond to the great displacement of a stroke without using a sensor.

In order to solve the problems, a first aspect of the invention is directed to a robot control apparatus having a position and speed control system for each axis of a robot in order to control a servo motor for driving the axis, comprising an angle measuring device for measuring a joint angle in relation to a joint coordinate system of the servo motor, a motion torque calculating section for calculating a motion torque command which is required for a motion of the servo motor based on a joint command, a disturbance torque estimating section for calculating a disturbance torque from a position and speed torque command calculated by the position and speed control system and the motion torque command, a minute displacement relationship calculating section for calculating a minute displacement relationship between a task coordinate system of the robot and a joint coordinate system of the servo motor based on the joint angle, an external force calculating section for carrying out a conversion to an external force on the task coordinate system by using the disturbance torque and the minute displacement relationship, a force control section for calculating a position correction amount on the task coordinate system of the robot based on the external force, and a joint angle correction amount calculating section for carrying out a conversion to a joint angle correction amount on the joint coordinate system by using the position correction amount and the minute displacement relationship.

Moreover, a second aspect of the invention is directed to the robot control apparatus, wherein the motion torque calculating section includes a gravity torque calculating section for calculating a gravity torque of a joint section of the robot, an acceleration torque calculating section for calculating an acceleration torque of the servo motor, a speed torque calculating section for calculating a speed torque for maintaining a speed of the servo motor, and a motion torque adding section for adding the gravity torque, the acceleration torque and the speed torque, thereby calculating a motion torque.

Furthermore, a third aspect of the invention is directed to the robot control apparatus, wherein the motion torque calculating section includes a second position and speed control system which is different from the position and speed control system, and a mechanical system imitating circuit imitating a robot mechanism section.

Moreover, a fourth aspect of the invention is directed to the robot control apparatus, wherein the force control section includes an impedance control section for calculating a position correction amount on a task coordinate system of the robot based on the external force, and a correction amount selecting section for causing the position correction amount to be valid or invalid.

Furthermore, a fifth aspect of the invention is directed to the robot control apparatus, wherein the external force calculating section includes a first external force calculating section for carrying out a conversion to an external force of the task coordinate system by using the disturbance torque and the minute displacement relationship, a second external force calculating section for carrying out a conversion to the external force of the task coordinate system by using the disturbance torque, acting points of the external force and a distance to each axis, and a robot axis external force average calculating section for obtaining an average value of each of outputs of the first external force calculating section and the second external force calculating section.

Moreover, a sixth aspect of the invention is directed to a robot control apparatus having a position and speed system for controlling a robot and an external axis to be operated in cooperation with the robot, comprising a robot axis motion torque calculating section for calculating a motion torque command which is required for a motion of the robot axis based on a joint command of the robot axis, a robot axis disturbance torque estimating section for calculating a disturbance torque from a position and speed torque command calculated by the position and speed control system and the robot axis motion torque command, a robot axis external force calculating section for converting the robot axis disturbance torque to an external force on a task coordinate system, an external axis motion torque calculating section for calculating a motion torque command which is required for a motion of the external axis based on a joint command of the external axis, an external axis disturbance torque estimating section for calculating a disturbance torque from the position and speed torque command calculated by the position and speed control system and the external axis motion torque command, and an external axis external force calculating section for converting the external axis disturbance torque to an external force on the task coordinate system.

Furthermore, a seventh aspect of the invention is directed to the robot control apparatus, further comprising an external force difference calculating section for taking a difference between an external force of the robot axis to be an output of the robot axis external force calculating section and an external force of the external axis to be an output of the external axis external force calculating section, thereby obtaining an external force difference calculation value.

Moreover, an eighth aspect of the invention is directed to the robot control apparatus, further comprising a stop processing section for stopping at least one of each robot axis and the external axis when the external force to be the output of the external force calculating section or the external force difference calculation value is greater than a preset threshold.

Furthermore, a ninth aspect of the invention is directed to the robot control apparatus, further comprising an operation pendant for operating the robot, the external force to be the output of the external force calculating section being displayed on the operation pendant.

Moreover, a tenth aspect of the invention is directed to a control method of a robot control apparatus having a position and speed control system for each axis of a robot in order to control a servo motor for driving the axis, comprising the steps of estimating a disturbance torque from a difference between a torque command calculated by modeling a robot mechanism section and a control section and a torque command output from the position and speed control system, estimating an external force from the disturbance torque and a displacement on a task coordinate system, carrying out an impedance control based on the external force, thereby calculating a position correction amount, and causing the position correction amount to be valid or invalid.

Furthermore, an eleventh aspect of the invention is directed to a control method of a robot control apparatus having a position and speed system for controlling a robot and an external axis to be operated in cooperation with the robot, comprising the steps of estimating a disturbance torque from a difference between a torque command calculated by modeling the robot and the external axis and a torque command output from the position and speed control system, estimating an external force from the disturbance torque and a displacement on a task coordinate system, carrying out an impedance control based on the external force, thereby calculating a position correction amount, and causing the position correction amount to be valid or invalid.

DESCRIPTION OF THE PREFERRED EMBODIMENTS

Figure 1:
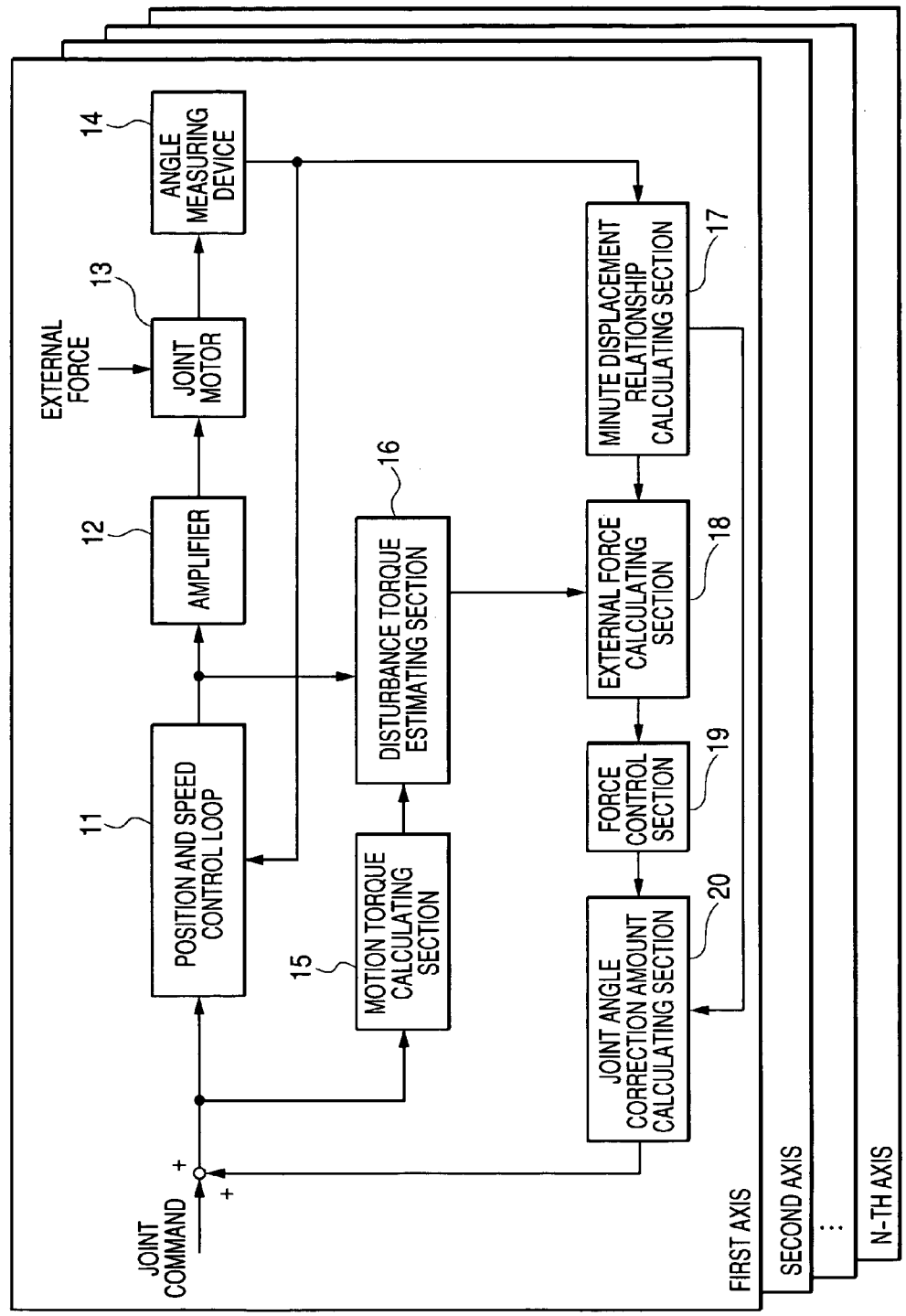
FIG. 1 is a diagram showing a first basic structure according to the invention.

A first embodiment of the invention will be described with reference to FIG. 1. 11 in FIG. 1 denotes a position and speed control loop which serves to input a joint command and to output a torque command to an amplifier 12, thereby driving a joint motor. Herein, a well-known position proportional—speed proportional integral control is used. In the position proportional—speed proportional integral control (hereinafter referred to as a position and speed control), each joint axis is flexibly displaced with difficulty with respect to a force applied from the outside by the action of a position control loop and a speed control loop which have a high gain. Therefore, a motion torque including a torque for compensating for a gravity required for operating each link of a robot (which will be hereinafter referred to as a gravity torque), a torque for acceleration (hereinafter referred to as an acceleration torque) and a torque corresponding to a speed (hereinafter referred to as a speed torque) is calculated by a motion torque calculating section 15 in response to a joint command sent from an upper controller to the position and speed control loop 11. A torque command to be the actual output of the position and speed control loop 11 is subtracted from the motion torque thus obtained by a disturbance torque estimating section 16. Consequently, a disturbance torque estimation value on a joint coordinate system can be calculated.

Next, a minute displacement relationship between a joint coordinate system and a task coordinate system, that is, a matrix which is generally referred to as a Jacobian matrix is calculated from a joint angle detected by an angle measuring device 14 in a minute displacement relationship calculating section 17. In an external force calculating section 18, the disturbance torque estimation value is multiplied by the minute displacement relationship between the coordinate systems. Consequently, a conversion to an external force estimation value in the task coordinate system can be carried out. The external force implies a force and a moment to be applied from an outside.

In a force control section 19, furthermore, the external force estimation value is converted to a position correction amount on the task coordinate system according to a force control algorithm such as an impedance control. By a joint angle correction amount calculating section 20, the position correction amount is converted to a joint angle correction amount on the joint coordinate system.

Accordingly, the joint angle correction amount thus converted is added to a joint command to be an input to the position and speed control loop 11. Consequently, it is possible to correct a position in which the robot corresponds to an external force.

Figure 2:
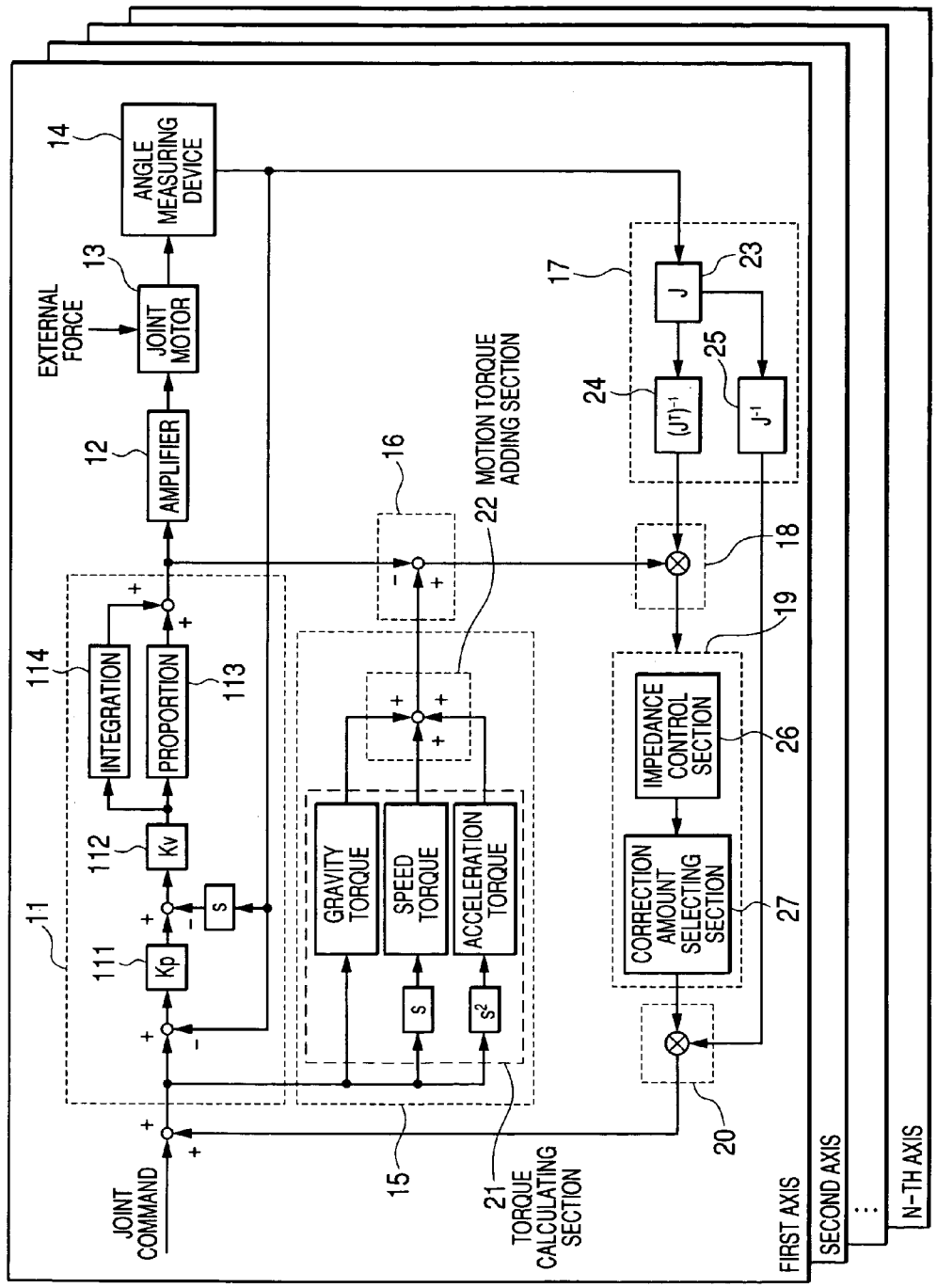
FIG. 2 is a diagram showing a first embodiment according to the invention.

A first embodiment of the invention is shown in FIG. 2 and description will be given to a control block diagram in which a control according to the invention is applied to a position and speed control on a joint coordinate system.

(1) Motion Torque Calculating Method

A joint command to be an input from an upper controller to the position and speed control loop 11 is sent to the motion torque calculating section 15. In a torque calculating section 21, a differentiation is once carried out to obtain a joint angular speed command and the differentiation is carried out twice to obtain the joint angular acceleration command, thereby acquiring a motion torque required for operating each link of the robot from the joint angular speed command and the joint angular acceleration command. The motion torque includes a gravity torque for overcoming the weight of each link to maintain an attitude, an acceleration torque required for overcoming the inertia of the link, and a speed torque required for overcoming the friction of a decelerator. The gravity torque can be obtained from the position of a center of gravity and weight of each link, and a joint command, the acceleration torque can be obtained by multiplying the joint angular acceleration by an inertia corresponding to the attitude of the robot, and the speed torque can be obtained by multiplying the joint angular speed by a coefficient of viscous friction and adding a Coulomb friction value. In a motion torque adding section 22, accordingly, it is possible to obtain a motion torque by adding the gravity torque, the acceleration torque and the speed torque.

(2) Disturbance Torque Estimating Method

A torque command to be an output from the position and speed control loop 11 is almost the same as the motion torque when there is no random, and is correspondingly increased or decreased as compared with the motion torque when a random is input for some factor. Accordingly, it is possible to obtain a disturbance torque estimation value τpresumption on a joint coordinate system by subtracting the torque command of the position and speed control loop 11 from the motion torque through the disturbance torque estimating section 16.

(3) External Force Estimation Value Calculating Method

A minute displacement relationship between a joint coordinate system and a task coordinate system in the minute displacement relationship calculating section 17, that is, a matrix which is generally referred to as a Jacobian matrix is calculated from the joint angle detected by the angle measuring device 14. By using a transposed inverse matrix, it is possible to calculate an external force estimation value on the task coordinate system from the disturbance torque estimation value on the joint coordinate system.

For example, in case of a robot having a degree of freedom of 6, the Jacobian matrix can be calculated in the following equation.

$$J = \begin{pmatrix} {}^0s_1 \times ({}^0P_r - {}^0P_1), & {}^0s_2 \times ({}^0P_r - {}^0P_2) & {}^0s_3 \times ({}^0P_r - {}^0P_3) & {}^0s_4 \times ({}^0P_r - {}^0P_4) & {}^0s_5 \times ({}^0P_r - {}^0P_5) & {}^0s_6 \times ({}^0P_r - {}^0P_6) \\ {}^0s_1 & {}^0s_2 & {}^0s_3 & {}^0s_4 & {}^0s_5 & {}^0s_6 \end{pmatrix} \quad [1]$$

wherein

J: Jacobian matrix (a minute displacement relational expression between a joint coordinate system and a task coordinate system), $°S_i$: a rotating direction vector of an i-th joint coordinate (based on a base coordinate system of a robot), $°P_i$: an i-th joint position vector (based on the base coordinate system of the robot), X: an cross product of a vector, and r: a task position vector of the robot.

In the external force calculating section 18, accordingly, an external force estimation value Fpresumption on the task coordinate system can be obtained in the following equation.

[Equation 2]

$$F\text{presumption} = (J^T)^{-1} \cdot \tau\text{presumption} \quad [2]$$

wherein "T" represents a transposed matrix and "−1" represents an inverse matrix.

(4) Angle Correction Amount Calculating Method

In the force control section 19, the external force estimation value Fpresumption can be converted to a position correction amount Xcomp on the task coordinate system by an impedance control section 26 of the task coordinate system.

[Equation 3]

$$M \cdot \ddot{X} + D \cdot \dot{X} + K \cdot X = F\text{presumption} \quad [3]$$

$\ddot{X}, \dot{X}, X$: an acceleration, a speed and a position on the task coordinate system, and M, D, K: an inertia, a viscosity and a stiffnessstiffness of an impedance.

Referring to the speed and the acceleration, the following equation is substituted for the Equation [3].

[Equation 4]

$$\dot{X} = (X - X_{old})/\Delta T, \ \ddot{X} = (\dot{X} - \dot{X}_{old})/\Delta T \quad [4]$$

wherein $X_{old}$: a speed obtained one sampling before on the task coordinate system, $X_{old}$: a position obtained one sampling before on the task coordinate system, and ΔT: sampling time.

In general, it is preferable that the Equation [4] should be substituted for the Equation [3] to work out the Equations. For simplicity, it is also possible to employ an equation using only the viscous component of an impedance control from the Equations. In this case, the position correction amount Xcomp of the task coordinate system can be obtained in the following Equation.

[Equation 5]

$$X\text{comp}=F\text{presumption}/D \quad [5]$$

Referring to the position correction amount Xcomp, it is possible to select the axis of the task coordinate system which causes the correction amount to be valid or invalid corresponding to the contents of a task by a correction amount selecting section 27.

Next, a conversion of the position correction amount Xcomp of the task coordinate system to a joint angle correction amount θcomp of the joint coordinate system by the joint angle correction amount calculating section 20 can be carried out in the following equation.

[Equation 6]

$$\theta\text{comp}=J^{-1}\mathsf{X}\cdot X\text{comp} \quad [6]$$

The joint angle correction amount θcomp obtained in the Equation [6] is added to a joint command sent from an upper controller so that the position of the robot can be successively corrected in relation to the size and direction of a random and the random can be thus absorbed. For example, description will be given to the case in which the tip of a gun comes in contact with a work in a spot welding work. In the case in which the fixed tip on the gun comes in contact with the work in an earlier stage than a position which is previously taught, there is a danger that the robot might be caused to generate an excessive force due to a high gain of the position and speed loop, thereby breaking the gun and the work in a normal position and speed control. By using the control, it is possible to prevent the robot from generating the excessive force by detecting a force acting on the tip as an external force on the task coordinate system by the random calculating section, controlling the force in the same direction and obtaining the joint angle correction amount.

Figure 3:
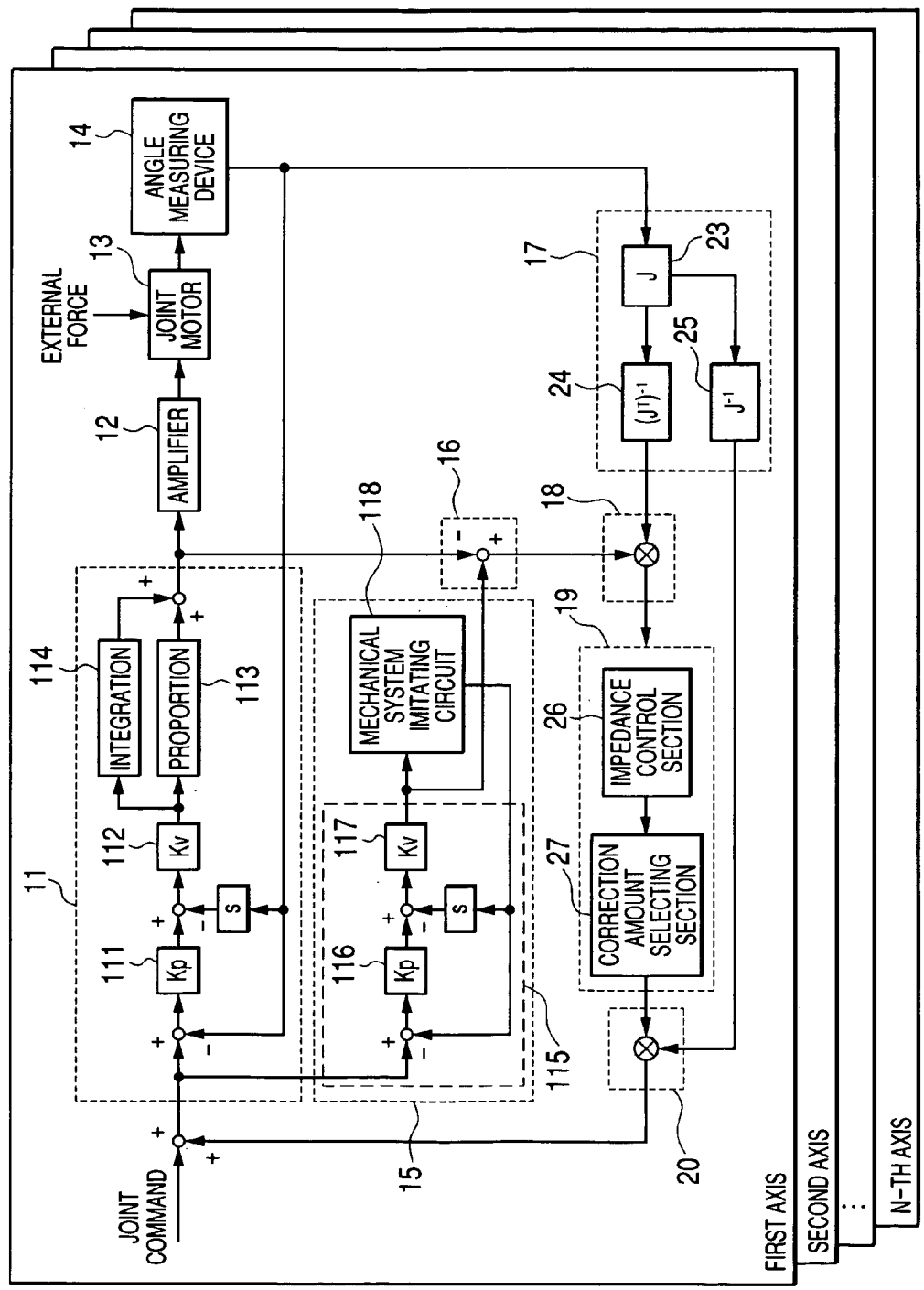
FIG. 3 is a diagram showing a second embodiment according to the invention.

A second embodiment of the invention is shown in FIG. 3 and description will be given to a control block diagram in which a control according to the invention is applied to a position and speed control on a joint coordinate system. As compared with the first embodiment, the processing of the motion torque calculating method is different one in the second embodiment.

(1') Motion Torque Calculating Method

A joint command to be an input from the upper controller to a position and speed control loop 11 is sent to a motion torque calculating section 15. In the motion torque calculating section 15, the joint command is input to a second position and speed control system 115 which is provided separately from the position and speed control system 11 and the position and speed control of a mechanical system imitating circuit 118 imitating an actual robot mechanism section is carried out. A position loop gain Kp116 of the second position and speed control system 115 has the same parameter value as a position loop gain Kp111 of the position and speed control loop 11. Similarly, a speed loop gain Kv117 of the second position and speed control system 115 has the same parameter value as a speed loop gain Kp112 of the position and speed control loop 11. The mechanical system imitating circuit 118 is constituted by a virtual control system having the same inertia, coefficient of viscosity and stiffness as those of a joint motor 13, and is a 2-inertia system model constituted by a motor inertia, a secondary side inertia and a decelerator, for example. If the 2-inertia system model is identical to an actual robot, the behaviors of the actual robot and a virtual robot are identical to each other if there is no random. Consequently, it can be supposed that a torque command to be the output of the first position and speed control system 11 and a torque command to be the output of the second position and speed control system 115 are identical to each other.

Accordingly, a torque command to be the output of the second position and speed control system 115 is used as a motion torque. It is preferable that the same processing as that of the methods (2) to (4) in the first embodiment should be carried out for a subsequent processing.

Figure 4:
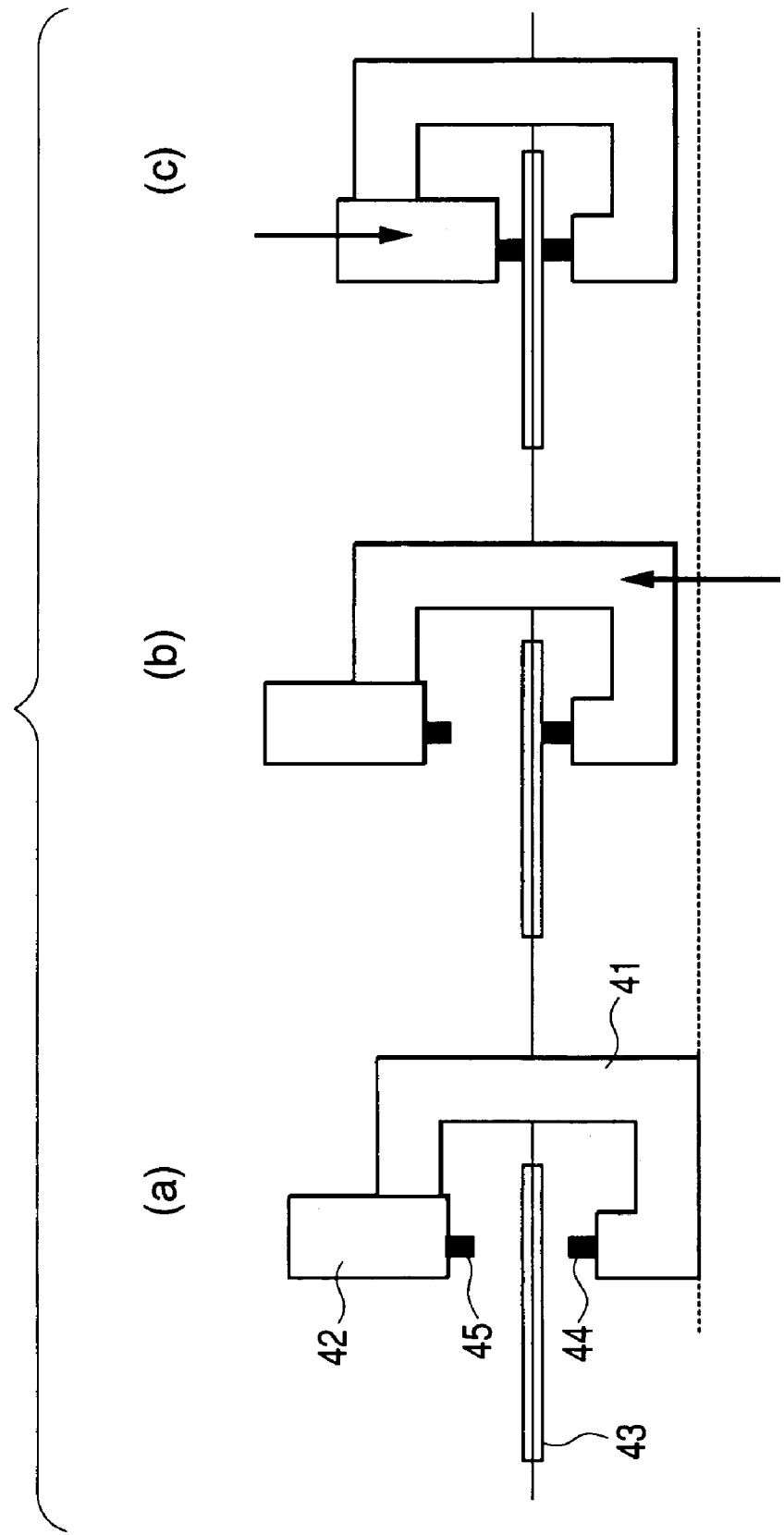
FIG. 4 is a view showing an action according to the invention.

Next, the action of the control explained in the first embodiment of the invention will be described with reference to FIG. 4 by taking, as an example, a position teaching task for spot welding.

In the position teaching task for the spot welding, an operator uses an operation pendant to guide a robot having a spot welding gun 41 provided on fingers, thereby positioning a fixed electrode 44 of the spot welding gun 41 and a movable electrode 45 to be driven by a movable side electrode driving motor 42 provided on the other end of the spot welding gun 41 with respect to a determined hitting point position on a work 43 and registering the position. In the case in which a normal position and speed control is used, the operator carries out the teaching work in the following procedure.

(a) Movement to Standby Position

In a standby state in which a portion between the fixing side electrode 44 and the movable side electrode 45 which are provided on the spot welding gun 41 is sufficiently large, the robot is guided in such a manner that the hitting point position of the work 43 is set onto a line connecting the fixing side electrode 44 and the movable side electrode 45.

(b) Movement of Fixing Side Electrode

The operator is to operate the robot at a very low speed immediately before the fixing side electrode 44 comes in contact with the hitting point position of the work 43 from below.

(c) Movement of Movable Side Electrode

After the movement of the fixing side electrode 44 is completed, the movable side electrode driving motor 42 is driven to operate the robot at a very low speed immediately before the movable side electrode 45 comes in contact with the hitting point position of the work 43 from above.

In the case in which the electrode and the work come in contact with each other in the works of (b) and (c), the robot generates an excessive force by a position and speed control so that the work 43, the fixing side electrode 44 and the robot might be broken. Therefore, the physical and mental fatigue of the operator is very high and a time for the teaching is also required considerably.

Next, the function of a force control according to the invention in the work will be described in detail.

(a) Movement to Standby Position

In a standby state in which the portion between the fixing side electrode 44 and the movable side electrode 45 which are provided on the spot welding gun 41 is sufficiently large, the robot is guided in such a manner that the hitting point position of the work 43 is set onto the line connecting the fixing side electrode 44 and the movable side electrode 45. During the guiding, a normal position and speed control is still carried out.

(b) Movement of Fixing Side Electrode

When switching the operation mode of the robot into the force control and taking the line connecting the fixing side electrode 44 and the movable side electrode 45 in the spot welding gun 41 onto the Z axis of a task coordinate system, for example, an operator selects the validity of a position correction amount in a Z-axis direction by the correction amount selecting section 27 of the force control section 19 and selects the invalidity of the position correction amount for the other X and Y axes. Next, the robot is operated until the fixing side electrode 44 comes in contact with the hitting point position of the work 43 from below. In the case in which the fixing side electrode 44 comes in contact with the work 43, a difference is made as a disturbance torque estimation value on a motion torque of the motion torque calculating section 15 and a torque command to be the output of the position and speed control loop 11, and the disturbance torque estimation value is calculated as an angle correction amount by the external force calculating section 18, the force control section 19 and the joint angle correction amount calculating section 20 and is added to a joint command. Consequently, the fixing side electrode 44 can maintain the contact state without applying an excessive force to the work 43.

(c) Movement of Movable Side Electrode

After the movement of the fixing side electrode 44 is completed, the movable side electrode driving motor 42 is driven to operate the robot until the movable side electrode 45 comes in contact with the hitting point position of the work 43 from above. By carrying out the force control for controlling the driving operation of the movable side electrode driving motor 42, the movable side electrode 45 can maintain the contact state without applying the excessive force to the work 43.

Figure 5:
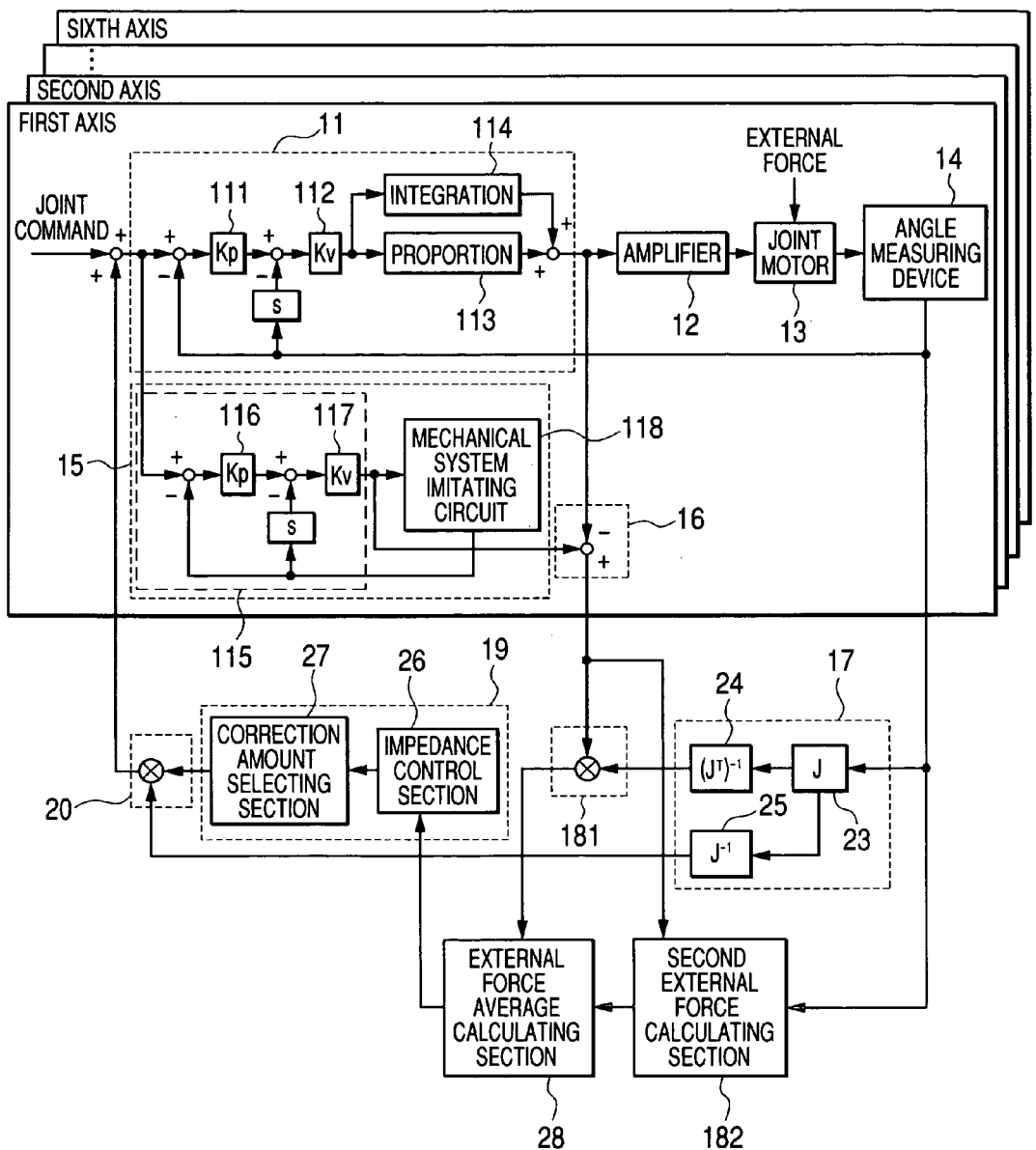
FIG. 5 is a diagram showing a third embodiment according to the invention.
Figure 8:
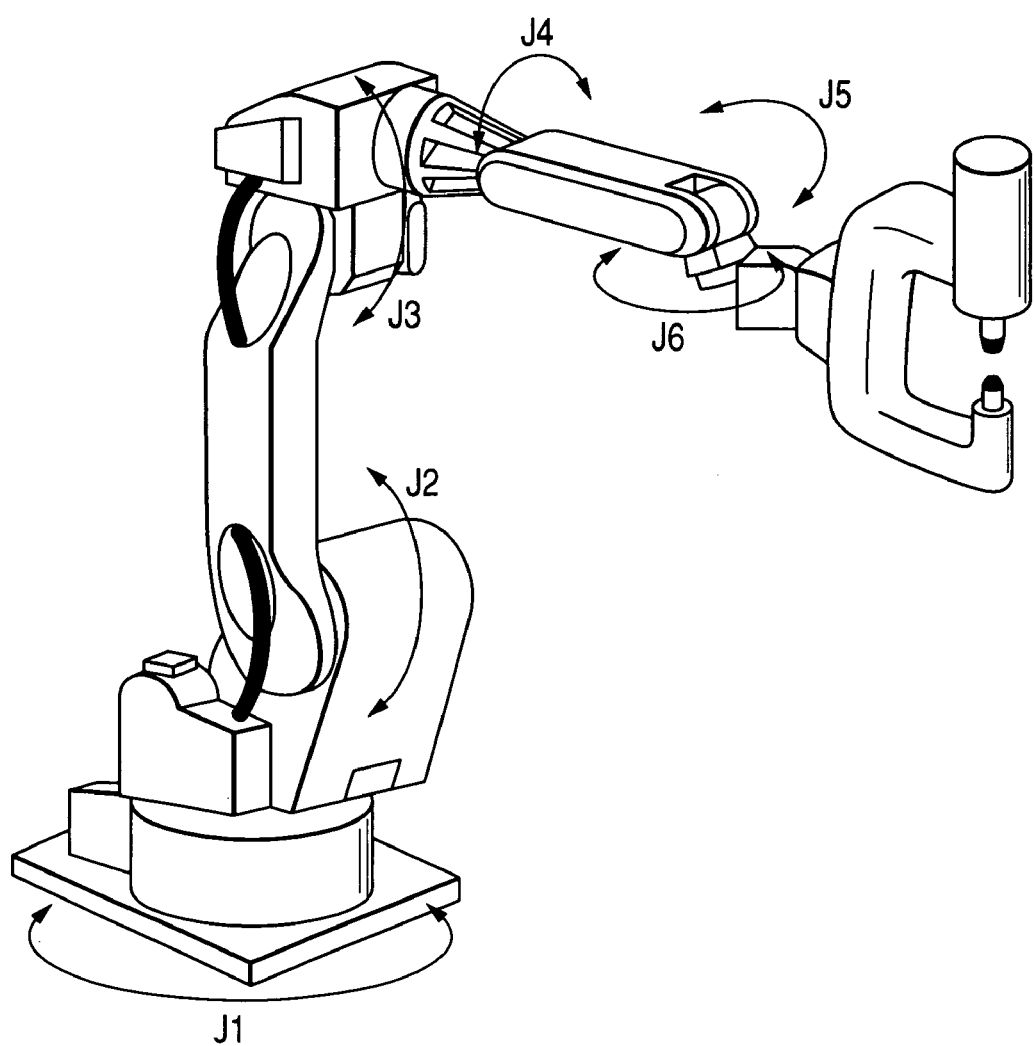
FIG. 8 is a view illustrating a robot according to the invention, FIGS. 9(*a*) and 9(*b*) show the views showing the action of a force according to the invention.

A third embodiment of the invention is shown in FIG. 5 and description will be given to a control block diagram in which a control according to the invention is applied to a position and speed control on a joint coordinate system. As compared with the first embodiment, the processing of the external force calculating method is different. Moreover, a robot will be described by taking, as an example, a robot for spot welding shown in FIG. 8.

In the first embodiment, the estimation of an external force is carried out for six axes including a force (Fx, Fy, Fz) and a moment (Mx, My, Mz) which act on fingers. In the case in which the electrode of a spot welding gun automatically corrects a position to follow the shift of the position of the work in spot welding, however, it is sufficient that only the contact force (Fz) in the open-close direction of the electrode is estimated. Therefore, only the force in the open-close direction of the electrode is estimated to simplify the processing.

As a method of estimating an external force in the open-close direction of the electrode, an estimation value F1 of one external force is obtained by three axes of J1 to J3 of the robot and estimation values F2, F3 and F4 of the external force are obtained by axes J4, J5 and J6, respectively. As a feature, the four external force estimation values are averaged to reduce misdetection and to enhance precision in detection.

For the processing from (1) Motion torque calculating method to (2) Disturbance torque estimating method, it is preferable that the same processing as that of the (1) to (2) in the first embodiment should be carried out.

(3″) External Force Estimation Value Calculating Method

Referring to a method of calculating the external force estimation value F1, a transposed inverse matrix 24 having a minute displacement relationship between coordinate systems obtained in the minute displacement relationship calculating section 17 is used to obtain the external force estimation value F1 on a task coordinate system from disturbance torque estimation values τpresumption 1 to 3 to be the outputs of the disturbance torque estimating section 16 in a first external force calculating section 181 in the same manner as the external force calculating method according to the first embodiment. Since a contact force in the open-close direction of the electrode is to be estimated, it is sufficient that a Jacobian matrix from the axes J1 to J3 of the robot to the wrist portion of the robot is obtained, and the operation can be carried out in the following equation.

$$J = \begin{pmatrix} {}^0s_1 \times ({}^0P_r - {}^0P_1), & {}^0s_2 \times ({}^0P_r - {}^0P_2) & {}^0s_3 \times ({}^0P_r - {}^0P_3) \\ {}^0s_1 & {}^0s_2 & {}^0s_3 \end{pmatrix} \quad [7]$$

Figure 9A:
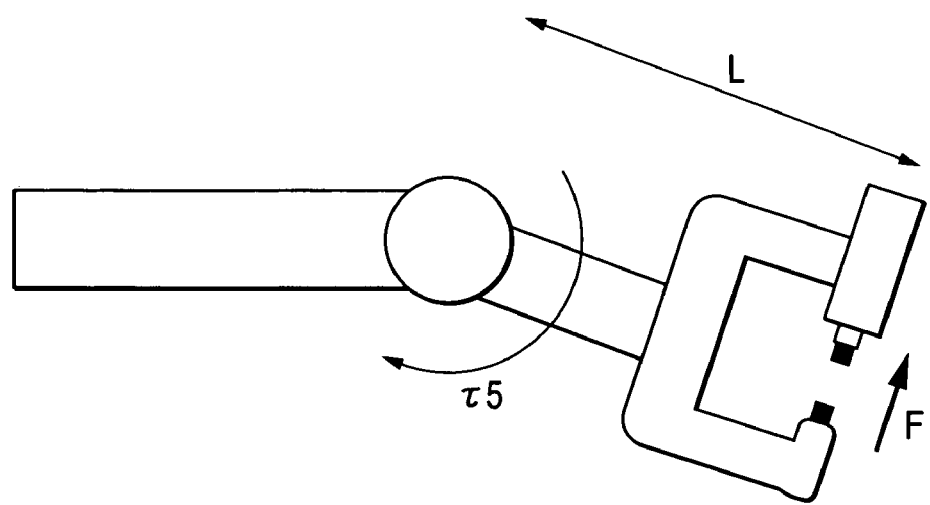

Next, description will be given to a method of calculating the external force estimation values F2, F3 and F4. In spot welding, both electrodes of a gun are closed to interpose a work therebetween, thereby carrying out the welding. The description will be given with reference to FIG. 9 by taking, as an example, the external force estimation value F3 in the case in which a fixing electrode on a robot side comes in contact with the work and an external force F acts in the open-close direction of the electrodes of the gun.

Figure 9B:
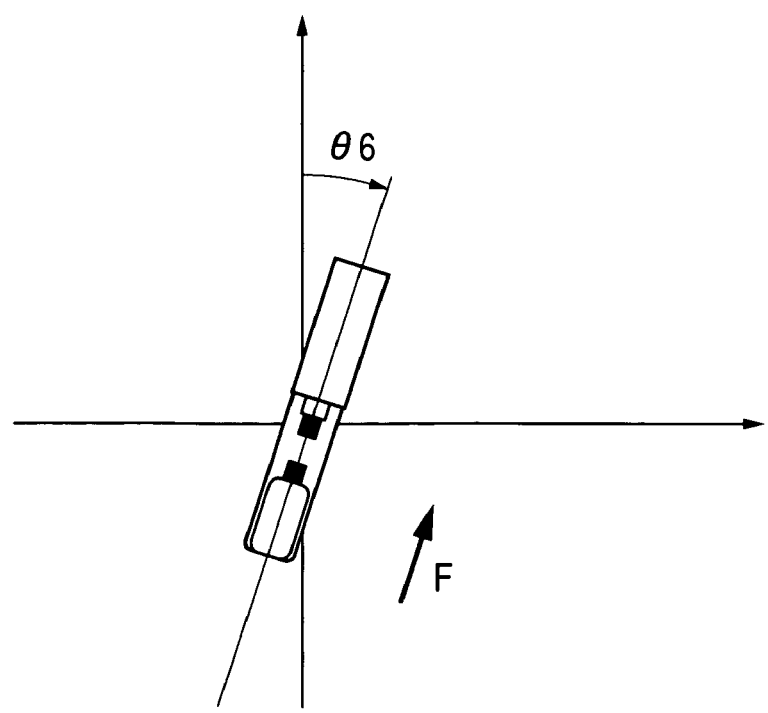
Figure 10:
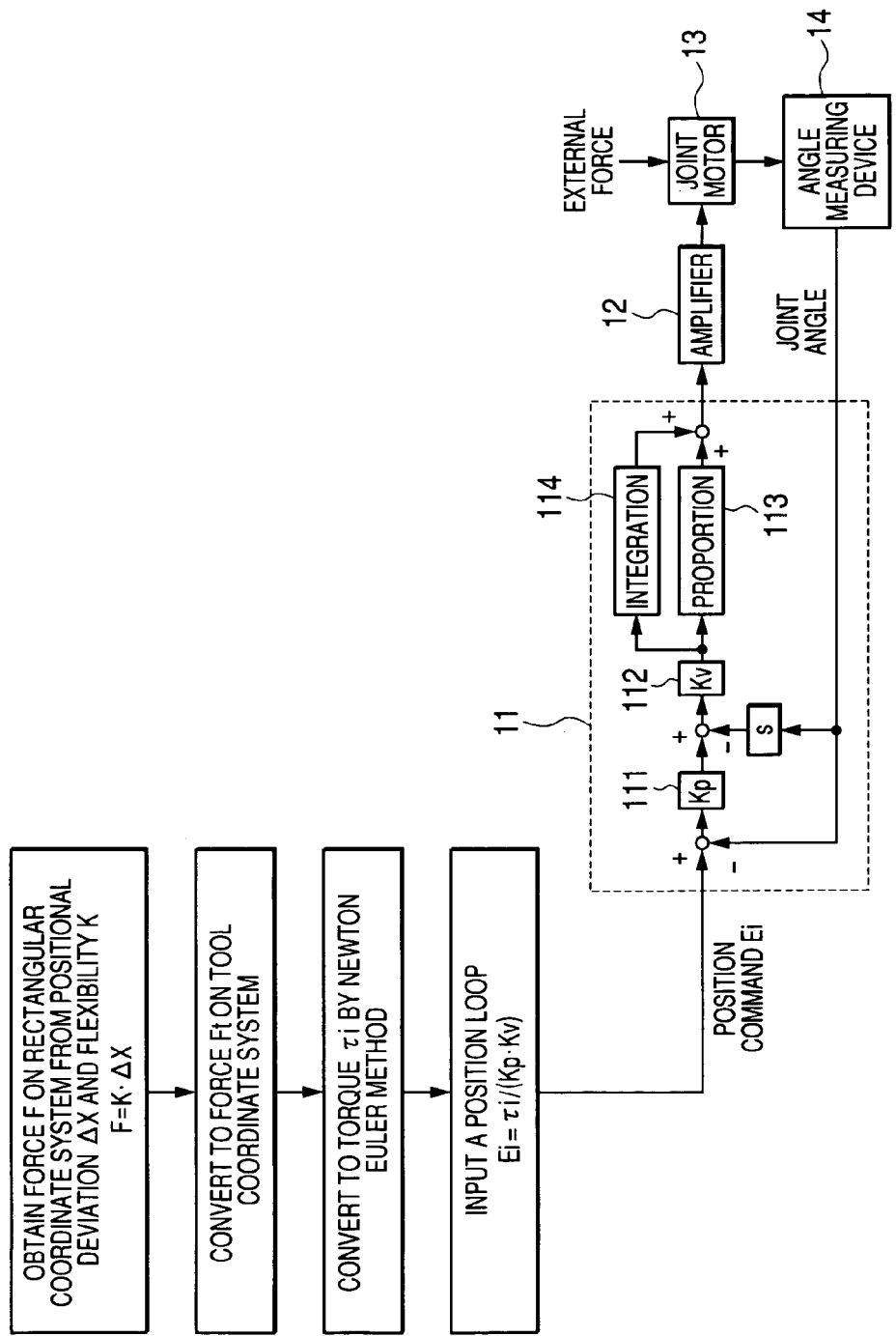
FIG. 10 is a diagram showing a conventional control method.

Since a torque τpresumption 5 acting on the axis J5 depends on the external force F and the angle of the axis J6 as shown in FIG. 9(b), it can be expressed in the following equation.

[Equation 8]

$$\tau\text{presumption } 5 = F \cdot L \cdot \cos(\theta 6) \quad [8]$$

wherein

F: an external force,

L: a distance to the axis J5 on the external force acting point of an electrode, and θ6: an angle of the axis J6.

Accordingly, the external force estimation value F3 (≈F) acting in the open-close direction of the electrode of the gun can be expressed in the following equation.

[Equation 9]

$$F = \tau\text{presumption } 5/(L \cdot \cos(\theta 6)) \quad [9]$$

In a second external force calculating section 182, accordingly, the external force estimation value F3 can be obtained. Similarly, F2 and F4 are also calculated. In an external force average calculating section 28, next, the external force estimation values F1 to F4 are averaged so that an external force average value can be obtained.

(4) For the processing of an angle correction amount calculating method, it is preferable that the same processing as that in the (4) according to the first embodiment should be carried out by using the external force average value.

In the same manner as in the first embodiment, the external force acting in the open-close direction of the electrode of the gun can also be calculated based on a torque acting on the axes J4 to J6 and a Jacobian matrix from a coordinate system set to the gun to the axes J4 to J6, which is not shown. In other words, it is also possible to estimate the external force (Fx, Fy, Fz) acting in the open-close direction of the gun by the axes J1 to J3 and the axes J4 to J6, respectively. In the third embodiment, a part of an expanded calculating equation is used. By using the Jacobian matrix for the axes J4 to J6, thus, the force (Fx, Fy, Fz) acting on the fingers can be obtained and application can also be carried out also when a direction in which the external force acts is set to be at least one axis. The following operation is carried out for the Jacobian matrix from the axis J4 to the axis J6.

$$J = \begin{pmatrix} {}^0s_4 \times ({}^0P_r - {}^0P_4), & {}^0s_5 \times ({}^0P_r - {}^0P_5) & {}^0s_6 \times ({}^0P_r - {}^0P_6) \\ {}^0s_4 & {}^0s_5 & {}^0s_6 \end{pmatrix} \quad [10]$$

In the same manner as in the first embodiment, subsequently, it is possible to obtain external estimation values Fpresumption 4 to 6 by calculating the Equation [2].

Figure 6:
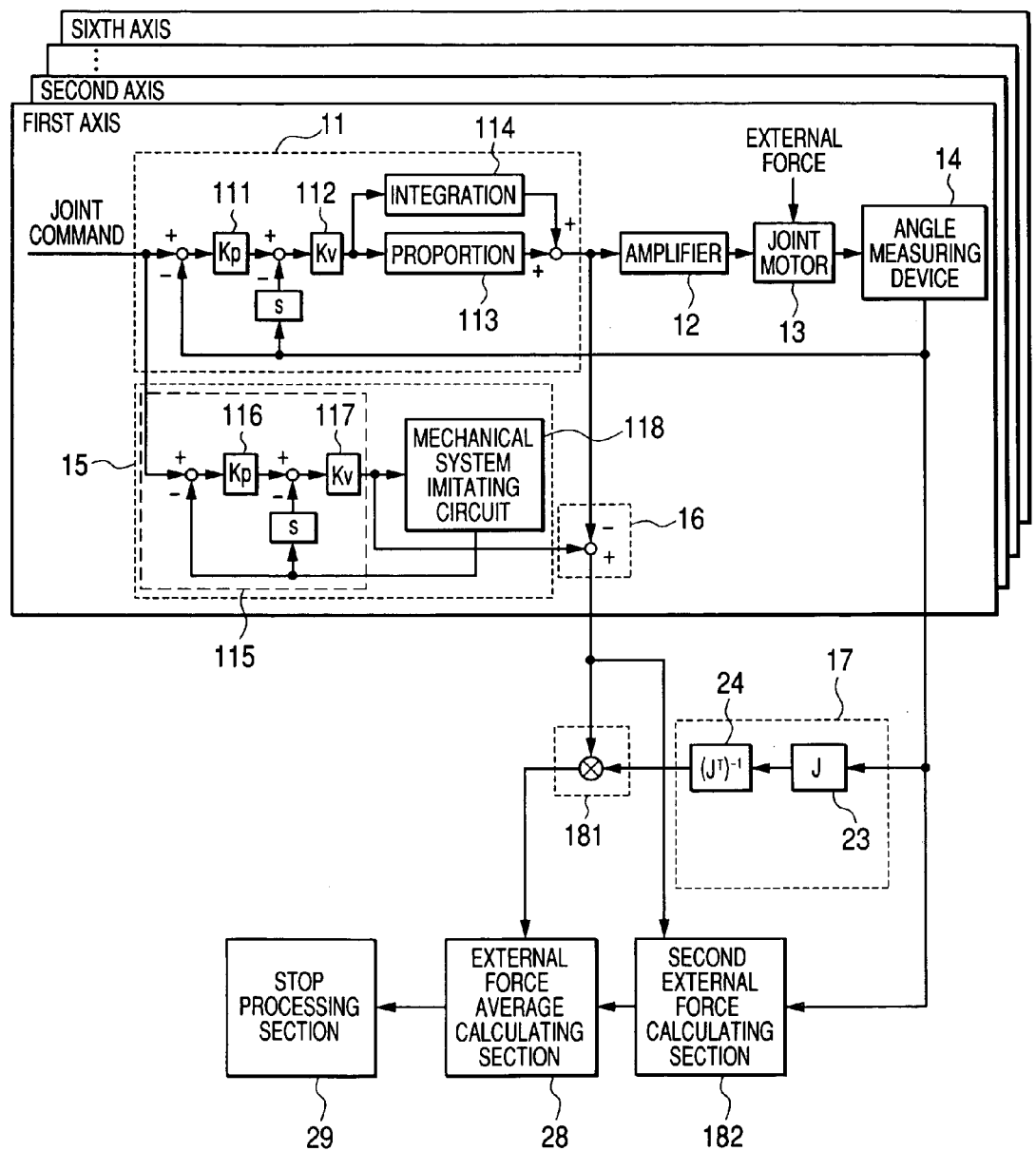
FIG. 6 is a diagram showing a fourth embodiment according to the invention.

A fourth embodiment of the invention is shown in FIG. 6 and description will be given to a control block diagram in which a control according to the invention is applied to a position and speed control on a joint coordinate system. As compared with the third embodiment, a force control section and a joint angle correction amount calculating section are different. While the description has been given to the control method of calculating the angle correction amount corresponding to the external force, thereby causing the robot to follow the external force in the first to third embodiments, it is an object to detect the external force, thereby stopping the operation of the robot. Moreover, the robot will be described by taking, as an example, a robot teaching work for spot welding shown in FIG. 8.

An operator guides the robot, thereby making such an attitude as to interpose a work between the electrodes of a gun for the spot welding which is provided on the tip of the robot. At this time, a sufficient distance is made between both of the electrodes and the work. Next, the operator lifts the fixing side of the electrode of the gun (that is, moves the robot in such a direction as to approach the work). Herein, the same processing as that of the (1) to (3″) in the third embodiment is carried out to obtain an external force average value in the external force averaging section 28.

(4′) Stop Processing Method

In a stop processing section 29, the external force average value thus obtained is compared with a preset detection threshold to stop the operation of the robot when the fixing electrode of the gun comes in contact with the gun. The robot is automatically stopped so that the teaching work for the spot welding can be carried out automatically. Consequently, it is possible to relieve the physical and mental load of the operator.

Moreover, a stop signal may be output to an external peripheral apparatus in place of the stoppage of the robot when a force is applied from the external peripheral apparatus to the robot, which is not shown.

Figure 7:
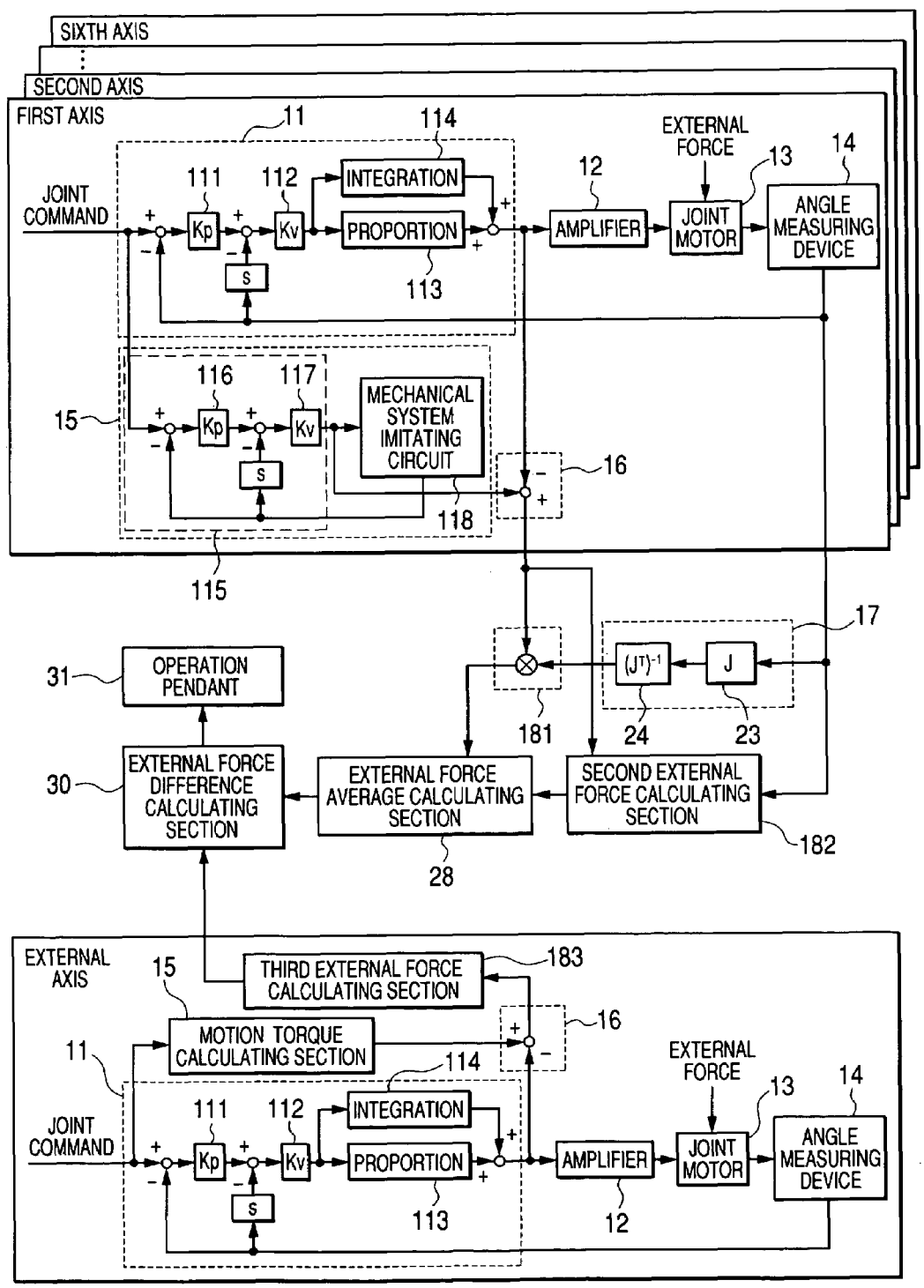
FIG. 7 is a diagram showing a fifth embodiment according to the invention.

A fifth embodiment of the invention is shown in FIG. 7 and description will be given to a control block diagram in which a control according to the invention is applied to a position and speed control on a joint coordinate system. As compared with the fourth embodiment, a portion using an external axis other than a robot axis is different. In the fourth embodiment, the external force acting on the control point of an end effector is estimated from each axis of the robot. A difference between an external force estimation value acting on the external axis and the external force estimation value of the robot is obtained to present, to an operator, whether a force actually acting on a work is balanced or to obtain the correction amount of a position in the same manner as in the first embodiment. Moreover, the robot will be described by taking, as an example, the robot teaching work for the spot welding shown in FIG. 8 in the same manner as in the fourth embodiment.

The operator guides the robot to make such an attitude as to interpose the work between the electrodes of the gun for the spot welding which are provided on the tip of the robot. At this time, a sufficient distance is made between both of the electrodes and the work. Next, the operator lifts the fixing side of the electrode of the gun (that is, moves the robot in such a direction as to approach the work). Herein, the same processing as that of the (1) to (3″) in the third or fourth embodiment is carried out to obtain an external force average value in the external force averaging section 28.

(4″) Method of Calculating External Force Estimation Value of External Axis

For a control system of a motor to drive an external axis, a disturbance torque estimation value τpresumption-ex1 is obtained in the same manner as in each axis of the robot in each of the (1) to (3). A gravity and a frictional component in a gun driving portion are separately compensated in the motion torque calculating section 15 in the same manner as in the robot.

In a third external force calculating section 183, next, an external random estimation value F5 is calculated from the disturbance torque estimation value τpresumption-ex1. For example, in the case in which the movable electrode of the gun is driven with a ball screw of a lead n, the external force estimation value F5 can be obtained in the following equation.

[Equation 10] $F5 = \tau presumption \cdot ex1 \cdot 2\Pi/n$ [11]

(5) External Force Presenting Method

In an external force difference calculating section 30, a difference between the external force estimation value F5 and the external force average value is obtained and is displayed on an operation pendant 31 connected to a robot controller. By comparing the external average value thus obtained with a preset detection threshold in the stop processing section 29 in place of the display on the operation pendant, alternatively, it is possible to stop the operation of the robot when the fixing electrode of the gun comes in contact with the work and to stop the operation of the gun also when the movable electrode of the gun comes in contact with the work, which is not shown. By carrying out a force control to cause forces acting on the work by both of the electrodes to be equal to each other, moreover, it is possible to enhance quality without forcibly deforming the work. Accordingly, the robot and the gun are stopped automatically so that the teaching work for the spot welding can be carried out automatically and the physical and mental load of the operator can be relieved.

As described above, according to the robot control apparatus in accordance with the first aspect of the invention, when causing a robot to carry out a contact work, it is possible to perform the flexible imitating operation of a task coordinate system which can also correspond to the great displacement of a stroke without using a sensor.

According to the robot control apparatus in accordance with the second aspect of the invention, a motion torque required for the operation of the robot is calculated. Consequently, it is possible to obtain a more accurate disturbance torque.

According to the robot control apparatus in accordance with the third aspect of the invention, a torque command sent from the position and speed control system using a model having the same parameter as that of an actual robot is utilized as a motion torque. Consequently, it is possible to obtain a more accurate disturbance torque.

According to the robot control apparatus in accordance with the fourth aspect of the invention, the validity or invalidity of a correction amount can be selected. Therefore, it is possible to select an axial direction which is flexible to the robot and an axial direction which has a high stiffness corresponding to a work.

According to the robot control apparatus in accordance with the fifth aspect of the invention, the estimation of an external force is obtained from a plurality of averages. Consequently, it is possible to increase precision in detection and to decrease misdetection.

According to the robot control apparatus in accordance with the sixth aspect of the invention, it is possible to detect an external force applied to a work object by the robot and the external axis. Consequently, it is possible to enhance the quality of a product.

According to the robot control apparatus in accordance with the seventh aspect of the invention, it is possible to detect a composite external force applied to the work object by the robot and the external axis. Consequently, it is possible to enhance the quality of a product.

According to the robot control apparatus in accordance with the eighth aspect of the invention, the estimated external force is compared with the preset threshold. In the case in which the robot comes in contact with the work object, consequently, the robot can be stopped automatically and the load of an operator can be decreased.

According to the robot control apparatus in accordance with the ninth aspect of the invention, the external force, the external force average value or the external force difference calculation value is displayed on the operation pendant. Consequently, the operator can decide a contact state and can avoid the breakage of the work and the robot.

According to the robot control method in accordance with the tenth aspect of the invention, the validity or invalidity of a correction amount can be selected. Therefore, it is possible to select an axial direction which is flexible to the robot and an axial, direction which has a high stiffness corresponding to a work.

According to the robot control method in accordance with the eleventh aspect of the invention, the validity or invalidity of the correction amounts of the robot axis and the external axis can be selected. Therefore, it is possible to select an axial direction which is flexible to the robot and an axial direction which has a high stiffness corresponding to a work.

What is claimed is:

1. A robot control apparatus having a position and speed control system for each axis of a robot in order to control a servo motor for driving the axis, comprising:
   an angle measuring device for measuring a joint angle in relation to a joint coordinate system of the servo motor;
   a motion torque calculating section for calculating a motion torque command which is required for a motion of the servo motor based on a joint command;
   a disturbance torque estimating section for calculating a disturbance torque from a position and speed torque command calculated by the position and speed control system and the motion torque command;
   a minute displacement relationship calculating section for calculating a minute displacement relationship between a task coordinate system of the robot and a joint coordinate system of the servo motor based on the joint angle;
   an external force calculating section for carrying out a conversion to an external force on the task coordinate system by using the disturbance torque and the minute displacement relationship;
   a force control section for calculating a position correction amount on the task coordinate system of the robot based on the external force; and
   a joint angle correction amount calculating section for carrying out a conversion to a joint angle correction amount on the joint coordinate system by using the position correction amount and the minute displacement relationship.

2. The robot control apparatus according to claim 1, wherein the motion torque calculating section includes:
   a gravity torque calculating section for calculating a gravity torque of a joint section of the robot;
   an acceleration torque calculating section for calculating an acceleration torque of the servo motor;
   a speed torque calculating section for calculating a speed torque for maintaining a speed of the servo motor; and
   a motion torque adding section for adding the gravity torque, the acceleration torque and the speed torque, thereby calculating a motion torque.

3. The robot control apparatus according to claim 1, wherein the motion torque calculating section includes:
   a second position and speed control system which is different from the position and speed control system; and
   a mechanical system imitating section imitating a robot mechanism section.

4. The robot control apparatus according to any of claims 1 to 3, wherein the force control section includes:
   an impedance control section for calculating a position correction amount on a task coordinate system of the robot based on the external force; and
   a correction amount selecting section for causing the position correction amount to be valid or invalid.

5. The robot control apparatus according to any of claims 1 to 3, wherein the external force calculating section includes:
   a first external force calculating section for carrying out a conversion to an external force of the task coordinate system by using the disturbance torque and the minute displacement relationship;
   a second external force calculating section for carrying out a conversion to the external force of the task coordinate system by using the disturbance torque, length between the effecting points of the external force and each axis; and
   a robot axis external force average calculating section for obtaining an average value of each of outputs of the first external force calculating section and the second external force calculating section.

6. The robot control apparatus according to any of claims 1 to 3, further comprising an operation pendant for operating the robot, the external force to be the output of the external force calculating section being displayed on the operation pendant.

7. A robot control apparatus having a position and speed system for controlling a robot and an external axis to be operated in cooperation with the robot, comprising:
- a robot axis motion torque calculating section for calculating a motion torque command which is required for a motion of the robot axis based on a joint command of the robot axis;
- a robot axis disturbance torque estimating section for calculating a disturbance torque from a position and speed torque command calculated by the position and speed control system and the robot axis motion torque command;
- a robot axis external force calculating section for converting the robot axis disturbance torque to an external force on a task coordinate system;
- an external axis motion torque calculating section for calculating a motion torque command which is required for a motion of the external axis based on a joint command of the external axis;
- an external axis disturbance torque estimating section for calculating a disturbance torque from the position and speed torque command calculated by the position and speed control system and the external axis motion torque command; and
- an external axis external force calculating section for converting the external axis disturbance torque to an external force on the task coordinate system.

8. The robot control apparatus according to claim 7, further comprising an external force difference calculating section for taking a difference between an external force of the robot axis to be an output of the robot axis external force calculating section and an external force of the external axis to be an output of the external axis external force calculating section, thereby obtaining an external force difference calculation value.

9. The robot control apparatus according to claim 8, further comprising a stop processing section for stopping at least one of each robot axis and the external axis when the external force to be the output of the external force calculating section or the external force difference calculation value is greater than a preset threshold.

10. A control method of a robot control apparatus having a position and speed control system for each axis of a robot in order to control a servo motor for driving the axis, comprising the steps of:
- estimating a disturbance torque from a difference between a torque command calculated by modeling a robot mechanism section and a control section and a torque command output from the position and speed control system;
- estimating an external force from the disturbance torque and a displacement on a task coordinate system;
- carrying out an impedance control based on the external force, thereby calculating a position correction amount; and
- causing the position correction amount to be valid or invalid.

11. A control method of a robot control apparatus having a position and speed system for controlling a robot and an external axis to be operated in cooperation with the robot, comprising the steps of:
- estimating a disturbance torque from a difference between a torque command calculated by modeling the robot and the external axis and a torque command output from the position and speed control system;
- estimating an external force from the disturbance torque and a displacement on a task coordinate system;
- carrying out an impedance control based on the external force, thereby calculating a position correction amount; and
- causing the position correction amount to be valid or invalid.

* * * * *